United States Patent [19]

Ramakrishnan et al.

[11] Patent Number: 5,404,536

[45] Date of Patent: Apr. 4, 1995

[54] SCHEDULING MECHANISM FOR NETWORK ADAPTER TO MINIMIZE LATENCY AND GUARANTEE BACKGROUND PROCESSING TIME

[75] Inventors: Kadangode K. Ramakrishnan, Maynard; David Sawyer, Merrimac; Phillip J. Weeks, Andover; Douglas M. Washabaugh, Leominster, all of Mass.

[73] Assignee: Digital Equipment Corp., Maynard, Mass.

[21] Appl. No.: 945,198

[22] Filed: Sep. 15, 1992

[51] Int. Cl.$^6$ .............................................. G06F 9/00
[52] U.S. Cl. .................................. 395/725; 395/650; 395/200; 364/241.1; 364/242; 364/DIG. 1; 364/940.5; 364/941.5; 364/DIG. 2
[58] Field of Search ................ 395/725, 325, 650, 200; 364/241.1, 242, DIG. 1, 940.5, 941.5, DIG. 2; 340/825.08

[56] References Cited

U.S. PATENT DOCUMENTS

| | | | |
|---|---|---|---|
| 3,905,025 | 9/1975 | Davis et al. | 395/725 |
| 4,314,334 | 2/1982 | Daughton et al. | 395/325 |
| 4,658,351 | 4/1987 | Teng | 395/650 |
| 5,142,675 | 8/1992 | Oi et al. | 395/650 |
| 5,161,223 | 11/1992 | Abraham | 395/600 |
| 5,193,189 | 3/1993 | Flood et al. | 395/650 |

Primary Examiner—Jack B. Harvey
Assistant Examiner—Glenn A. Auve
Attorney, Agent, or Firm—A. Sidney Johnston; Christine M. Kuta

[57] ABSTRACT

Method and apparatus for scheduling operations of a network adapter in such a way as to minimize latency in processing received data packets, while still guaranteeing time for processing necessary background tasks. The method includes executing a polling loop in which repeated tests are made for the presence of receive data to process, but only a limited amount of receive data processing is performed before checking for background processing that needs to be performed. The polling loop ensures that immediate attention is given to processing of receive data, without the inherent latency of interrupt processing, but still gives periodic opportunities for background processing. Background processing is performed for a guaranteed minimum processing time before permitting a return to receive processing. Background processing may be performed without a guaranteed minimum processing time, but only when there is currently no receive processing to do.

13 Claims, 2 Drawing Sheets

SCHEDULING MECHANISM FOR NETWORK ADAPTER TO MINIMIZE LATENCY AND GUARANTEE BACKGROUND PROCESSING TIME

BACKGROUND OF THE INVENTION

This invention relates generally to hardware interfaces between communication stations and various types of transmission media used in communication networks, particularly high-speed token ring networks such as the Fiber Data Distributed Interface (FDDI) token ring system.

A network adapter is an interface device that is located between a communication network and an input-output (I-O) bus of a workstation to be connected to the network. Data packets flow through the adapter in both directions, and the adapter has two broad functions to perform. It has to make sure that packets do not get lost, or at least that not too many get lost, and it has to make sure that progress is made in processing traffic received from the network or to be transmitted onto the network. In relatively high-speed networks, such as the Fiber Data Distributed Interface (FDDI) token ring system, the network adapter often has its own processor to handle these functions. The present invention is concerned with relatively low cost adapters, in which no transmit traffic (toward the network) is handled by the adapter processor. In this situation, the adapter has two basic tasks to perform: processing packets received from the network and delivering them to a host processor in a timely manner, and performing background tasks for the FDDI system.

Conventionally, adapters have used scheduling mechanisms that are "interrupt driven," which means that, when a packet is received by the adapter, ongoing processing is interrupted to handle the incoming packet. The use of interrupts for scheduling operations of a network adapter is a convenient technique for several reasons. First, each processing function can be developed independently and "compartmentalized" for testing and subsequent modification. Interrupts allow for a clean division of the functions, and each function can be asynchronously invoked as the need arises. Theoretically, an interrupt driven scheduling approach could also allow for a timely invocation of the functions. But if the interrupt processing overhead becomes too great compared with the remainder of work performed for tasks invoked by interrupts, the latency for completing the functions can be excessive. In other words the interrupt processing overhead can be a large percentage of the total processing load.

In general, network adapter functions include: "receive processing," to handle the movement of data received from the network, "transmit processing," to handle the movement of data to be transmitted onto the network, timer driven background tasks, background management tasks, background command processing (initiated by a host processor), and processing exception conditions. The background host command processing tasks are for such functions as initialization and FDDI management. The background management tasks fall into various categories: station management tasks relating to frame processing (involving messages that help keep the token ring network operational), and ring management and connection management tasks. In the context of the present invention, we are concerned with all types of processing except transmit processing, and the specific nature of the background tasks is not important.

Interrupt driven scheduling mechanisms have two significant disadvantages. One is that they necessarily involve additional latency before received information is made available to a program specific to receive processing that will ultimately process the information. Interrupt driven scheduling mechanisms typically have an "idle loop" that is executed by the adapter while waiting for an interrupt. The interrupt takes the adapter out of its idle loop and into an interrupt service routine, which in turn invokes a processing routine to handle the received packet. Delay occurs in saving the "context" in which the interrupt occurred, i.e. saving register values and other critical information. The saving of these registers is desirable so that the interrupt service routine may use the registers to process received packets more efficiently. The latency involved in these operations interposes a significant delay in the processing of received packets. Some applications are more sensitive to this latency than others, but the latency is significant in many cases.

The other major disadvantage of interrupt driven scheduling mechanisms is that the high priority afforded to the processing of received packets may repeatedly deny processing time to background tasks awaiting completion. In heavy traffic situations, it may be impossible to guarantee any minimum processing time for these background tasks.

A related problem with interrupt driven scheduling for network adapters is the potential for "livelock" situations. "Livelock" is a term coined to distinguish from "deadlock," which implies total paralysis of a processing system. A livelock can occur when there is so much received traffic that the adapter spends all of its time responding to interrupts generated as a result of received packets, and consequently there is insufficient time to deliver a packet to its destination before another interrupt occurs. In the event of a livelock, there is also no time to devote to background tasks.

One approach to avoiding livelocks is to disable interrupts until a received packet has been processed to completion. Partially completed work cannot be interrupted if this approach is used, but obviously this does nothing to improve the latency for a received packet. Background processing can be guaranteed using a similar approach, i.e. disabling interrupts periodically for a sufficient amount of time to process background tasks. The difficulty with this approach is in choosing an appropriate estimate of time for which to disable interrupts. If the estimate is too long, the adapter is unnecessarily prevented from performing one of its principal functions, which is to receive the next arriving packet. It would also exacerbate the latency. If the estimate is too short, there is no guarantee that the background tasks will be performed, because a subsequent interrupt for reception may occur.

It will be appreciated from the foregoing that there is still need for improvement in the way that network adapter operations are scheduled. The present invention satisfies this need.

SUMMARY OF THE INVENTION

The present invention resides in a network adapter scheduling method, and corresponding apparatus, in which a polling loop includes receive data processing, and checking for background processing tasks. Briefly, and in general terms, the method of the invention comprises the steps of executing a polling loop, including checking for receive processing to do, performing a limited amount of any receive processing that needs to be performed, and then identifying any background processing tasks that need to be performed; and executing the background processing tasks, if any are identified in the polling loop. A minimum background processing execution time is guaranteed (for background tasks) before a return is made to the ongoing receive processing. The method includes the step of returning to the polling loop no later than upon expiration of the minimum background processing time. In the method of invention, latency in processing any receive data is minimized by eliminating the overhead associated with an interrupt on receiving a packet of data, while still guaranteeing processing time for necessary background tasks.

More specifically, the step of identifying background tasks includes checking for the presence of tasks already in progress, and checking for the occurrence of timer interrupts pending and to be dealt with. These checking steps are performed after performing a selected and limited amount of receive data processing, such as by processing a selected number of data buffers. Since the time for this limited amount of processing is known fairly accurately, the occurrence of timer interrupts that are pending can be checked for on a regular and frequent basis, without the inherent overhead of interrupt processing routines. The need for "timer interrupts" is to deal with those cases when there are no packet buffers processed for some time. If the adapter was busy all the time, these timer interrupt events would be checked without the need for hardware interrupts.

The step of identifying background tasks may also include counting the number of receive buffers processed, to determine the time at which this identification is performed. A transfer is made to this background processing after processing a preselected number of buffers of received data. This ensures a return to background processing (to check for tasks needing work) periodically at intervals greater than the timer interrupt intervals.

The invention also encompasses apparatus corresponding to the methods summarized above. In general, the apparatus comprises means for executing a polling loop, including means for checking for receive processing to do, means for performing a limited amount of any receive processing that needs to be performed, and means operative after the means for performing a limited amount of receive processing, for identifying any background processing tasks that need to be performed. The apparatus also includes means for executing background processing tasks, if any are identified in the polling loop, wherein a minimum background processing execution time is guaranteed before a return to ongoing receive processing; and means for returning to the polling loop no later than upon expiration of the minimum background processing time. In the apparatus of the invention, latency in processing receive data is minimized, while still guaranteeing processing time for necessary background tasks.

It will be appreciated from the foregoing that the present invention represents a significant advance in the field of network adapters. In particular, the invention minimizes latency in processing receive data, but still provides guarantees of background processing. Other aspects and advantages of the invention will become apparent from the following more detailed description.

DESCRIPTION OF THE PREFERRED EMBODIMENT

Figure 1:
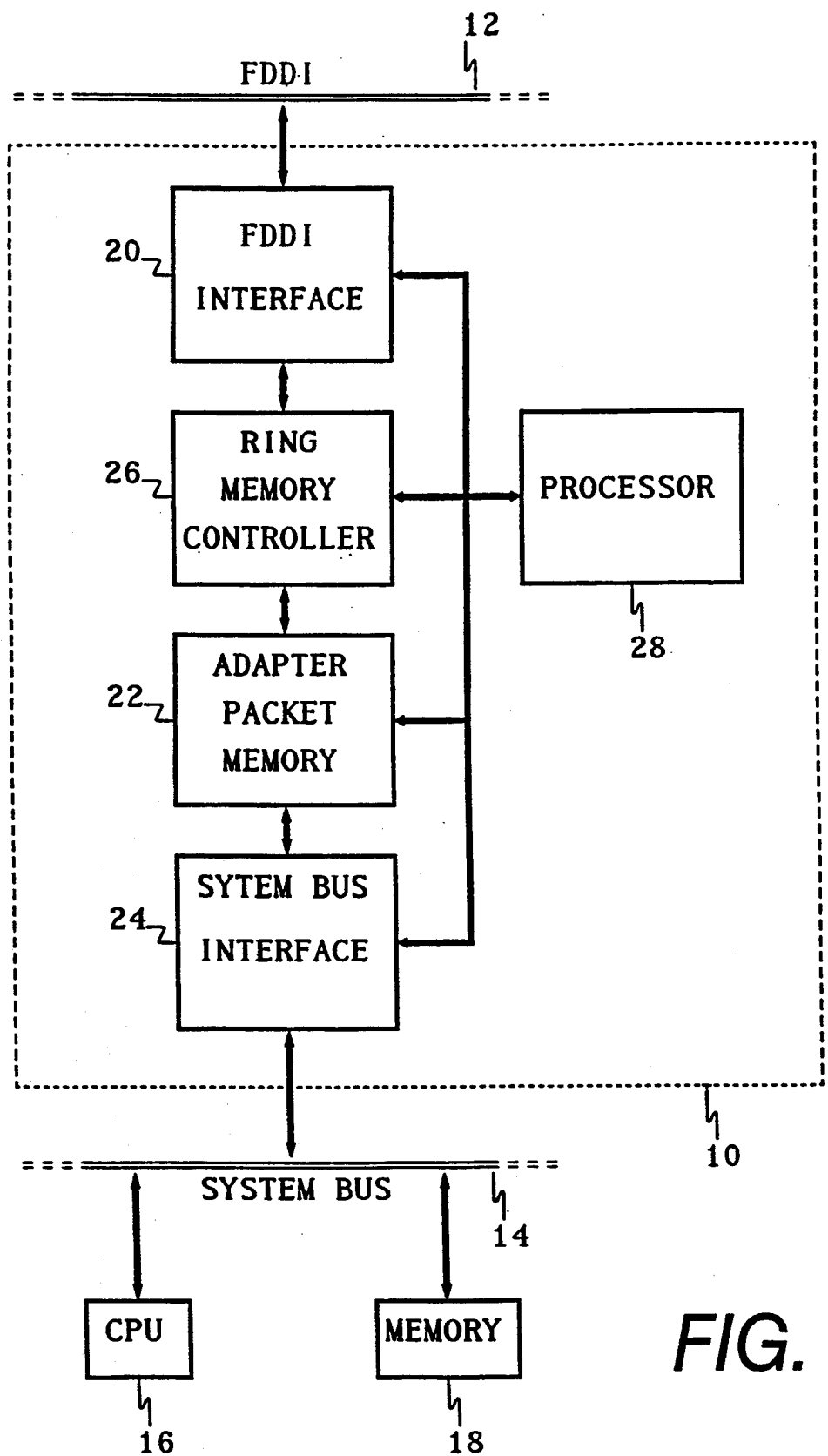
FIG. 1 is block diagram showing a network adaptor in relation to a network and a system bus.

As shown in the drawings by way of illustration, the present invention is concerned with a network adapter scheduling technique that minimizes latency in processing received packets, and provides a guarantee of processing time for background tasks that have to be performed by the adapter. The conventional approach to scheduling operations of a network adapter is to use interrupt processing to switch from one task to another. Because the processing of received data packets has the highest priority, interrupt-driven scheduling of adapter operations may deny processing time to background tasks. Moreover, an interrupt-driven system necessarily imposes a high cost in terms of latency in the processing of received packets.

In accordance with the present invention, processing of received packets is usually initiated from a polling loop, without interrupts and the processing overhead that they entail. If a data packet is received when the adapter is idle, i.e. in the polling loop, the packet will be processed with a minimum of latency. If a packet arrives while background processing is in progress, an interrupt is needed to initiate processing of the packet, but the need for interrupts is statistically quite small. To ensure that the background tasks are performed in a timely manner, the polling loop includes a guarantee of a preselected amount of background processing time, as will be explained in more detail.

Because the scheduling mechanism of the invention rarely uses interrupts for receive processing and does not use them at all to determine whether background work is pending, or has to be scheduled, the invention drastically reduces the amount of context switching that is usually needed in interrupt driven systems. The method of the invention also eliminates the overhead involved in processing timer interrupts. Often, timer interrupts do not result in any real tasks being performed. The timer interrupt processing function checks to see if there is work to be done, and, if there is none, returns to whatever was going on prior to the timer interrupt. The same check for outstanding work that the timer interrupt performs, can be performed in the polling loop, thereby eliminating context switching and other interrupt processing overhead.

More specific details of the invention can best be understood with reference to the drawings. FIG. 1 depicts the general form of a network adapter, indicated by reference numeral 10, connected between a token ring network 12, indicated as being of the fiber distributed data interface (FDDI) type, and a system bus 14. The system bus 14 has connected to it a central processing unit (CPU) 16 and a system memory 18. The adapter 10 processes data packets received from the network 12 and stores them in the system memory 18 for subsequent processing by the CPU 16.

The adapter 10 includes an FDDI interface 20, a packet memory 22, a system bus interface 24, a packet memory controller 26 and an adapter processor 28. In the adapter configuration with which the present invention is concerned, the processor 28 handles received data packets (from the network 12) and handles background tasks required of it by FDDI station management protocols. Transmitted data packets are handled separately by the station CPU 16. Received data packets are stored temporarily in the packet memory 22 and later delivered to the system memory 18 under control of the adapter processor 28. The rate at which received packets must be accepted from the network 12 is beyond the control of the adapter, and traditionally operation of the processor 28 is scheduled on an interrupt driven basis, to ensure that priority is given to processing the receive traffic.

Figure 2:
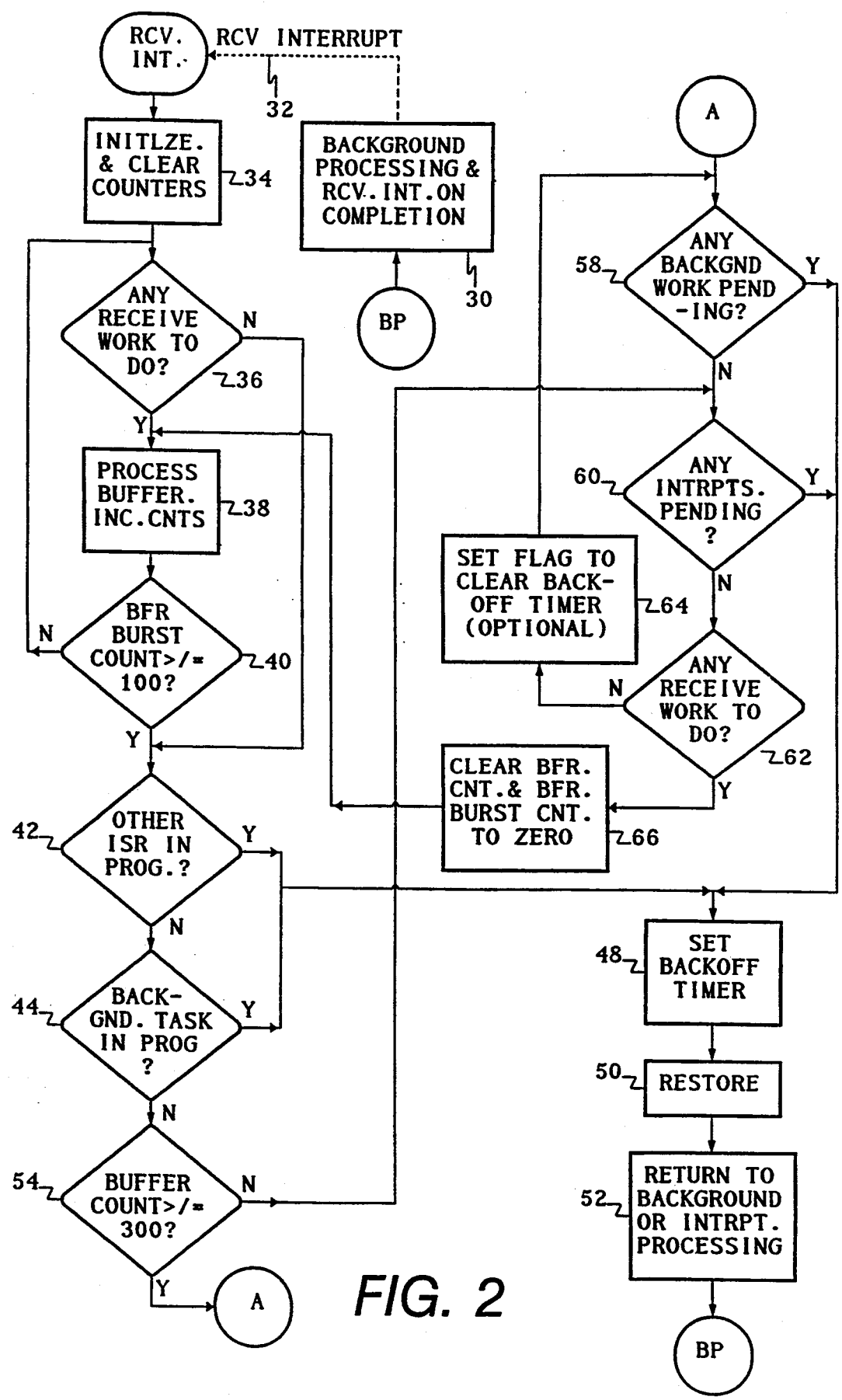
FIG. 2 is a flowchart depicting functions performed by the network adaptor in accordance with the invention.

Although the present invention still uses interrupts to switch from background processing to the processing of received data packets, most of the receive processing is initiated from a polling loop, as will now be described with reference to FIG. 2. The processor 28 (FIG. 1) performs two basic tasks: background processing, indicated by block 30, and receive processing and polling, which is depicted by the remainder of FIG. 2.

The background processing (in block 30) continues until completion or until the occurrence of a receive interrupt, as shown at 32. The first action in response to the interrupt is to save the context of the interrupted processing and to initialize registers needed for receive processing, as indicated by block 34. Specifically, two counters referred to as a buffer counter and a buffer burst counter are cleared to zero. Receive processing begins by checking to see if there is any receive work to do, as indicated in block 36. If so, a buffer of input data is processed, as indicated in block 38, and the buffer burst counter and the buffer counter are incremented. The buffer burst counter keeps track of the number of buffers processed, up to a maximum burst count, such as 100. The buffer counter keeps track of the number of buffers processed, up to a larger maximum, such as 300. Although these are logically separate counters, they could be implemented physically as a single counter.

After processing a buffer, the burst counter is checked, in block 40, to see if the burst count maximum has been reached or exceeded. If not, receive processing continues, starting in block 36 again and processing additional buffers until the burst count maximum is reached. When the burst count maximum is reached, this event provides an opportunity to return to background task processing. In the present embodiment of the invention, up to 100 buffers of data are processed in each burst. Using a direct memory access (DMA) for transferring data to the system memory, each buffer of 512 bytes can be transferred in approximately 22.5 $\mu s$ (microseconds). Therefore, 100 buffers can be processed in approximately 2.25 ms (milliseconds). In the system under consideration, timer interrupts occur every 20 ms. Thus, checking for timer interrupts every 2.25ms establishes a time bound within which the interrupts will be processed. At worst, a timer interrupt will be processed within 2.25 ms of its occurrence.

If the maximum burst count is reached, as determined in block 40, and if another interrupt service routine is in progress, as determined in block 42, or if a background task is in progress, as determined in block 44, receive processing is suspended. A backoff timer is set, as indicated in block 48, the context of the interrupted processing is restored, as indicated in block 50, and a return is made to continue background or interrupt processing, as indicated in block 52, through the connector labeled BP. In the present embodiment, the backoff timer is set to 640$\mu s$, and no receive interrupts are processed during this time. If, however, the background processing completes before the allotted 640$\mu s$ time interval, then we return to processing receive packets by forcing a receive interrupt, as indicated by transition 32.

If no interrupt service routines or background tasks are in progress, as determined in blocks 42 and 44, the buffer count is checked, in block 54, to see whether a maximum count, such as 300 buffers, has been reached or exceeded. The maximum buffer count is chosen to be equivalent to a maximum time that can elapse during receive processing, before an opportunity will be given to start a background processing task. A maximum buffer count of 300 processed buffers is equivalent to an elapsed time of approximately 7.5 ms. Some types of background tasks require attention approximately every 10 ms, so these tasks will be checked at an adequately rapid rate based on the processing or 300 buffers. When the maximum count is reached, the next inquiry is whether any background work is pending, as indicated in block 58, reached through the connector labeled A. If any background work is pending, or if any interrupts are pending (block 60), processing continues in block 48, i.e. the backoff timer is set, context registers are restored, and return is made to background or interrupt processing.

If there are neither background tasks nor interrupts pending, the status of receive work is checked, in block 62. If there is no receive work to do either, processing returns to block 58 to check for background work again. Optionally, the backoff timer is cleared, in block 64, before returning to block 58. More precisely, the function performed in block 64 (optionally) is to set a flag that will be used in block 48 on the next occasion that a return is made to background processing. The flag indicates to block 48 that the backoff timer will not be set. The loop including blocks 58, 60, 62 and 64 is the basic polling loop that is followed when there is no processing at all to be done. Exit from the loop is either to block 48, to return to background or interrupt processing, or to block 66, which clears the buffer burst counter when block 62 determines that there is receive work to do. After clearing the buffer burst counter, processing continues in block 38, where another receive buffer is processed.

The guarantees provided by the polling loop of FIG. 2 include the checking for a timer interrupt every 2.5 ms, so that timer events, which may occur on a 20 ms timer "tick," will be dealt with in a timely fashion. The background processing guarantee is 640$\mu s$ every 22.5 ms, or 64 ms every approximately 2.5 seconds. After taking timer check processing into account, the technique provides approximately 25 ms of guaranteed processing time every second, which is more than adequate for most purposes. The other guarantee provided by the polling loop is to those services that require processing every 10 ms approximately. The backoff timer provides 640$\mu s$ of processing time every 10 ms for this purpose. It will be understood, of course, that the time guarantees can be adjusted to meet the needs of a specific network and network adapter configuration.

An optional feature of the invention is to enable the receive data interrupt when returning to background processing when there is no ongoing receive processing. The feature is implemented in block 64, which sets a flag ensuring that the backoff timer will not be set on returning to background processing when there is currently no receive work to do. On the subsequent receipt of a packet while in background processing, the packet is immediately processed rather than waiting for the guaranteed 640μs of background processing time. Thus the first-packet latency is reduced, in those cases when the packet is received during background processing, but there is a reduction in guaranteed background processing time. In heavy traffic situations, this will not be a consideration, since, when receive processing is ongoing, the background processing guarantee will be observed without interruption.

It will be appreciated from the foregoing that the present invention represents a significant advance in the field of network adapters. In particular, the invention provides a convenient technique for minimizing latency in the processing of received data, while at the same time guaranteeing time for processing necessary background tasks. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A method for scheduling operations of a network adapter, comprising the steps of:
    executing a polling loop, including checking for received data processing to perform, performing a limited amount of any received data processing that needs to be performed, and then identifying any background processing tasks that need to be performed;
    executing background processing tasks, if any are identified in the polling loop, wherein there is a guaranteed maximum time that can pass without execution of background processing, and wherein there is a guaranteed predetermined minimum background processing execution time before a return to ongoing received data processing; and
    returning to the polling loop no later than upon expiration of said predetermined minimum background processing time;
    whereby latency in processing received data is minimized, while still guaranteeing processing time for necessary background tasks.

2. A method as defined in claim 1, wherein:
    the step of identifying background tasks includes checking for the presence of tasks already in progress, and checking for the occurrence of timer interrupts.

3. A method as defined in claim 1, wherein:
    the step of identifying background tasks includes counting receive buffers processed, wherein a check is made for ongoing background processing after processing a preselected number of buffers of received data, where processing said preselected number of buffers has a duration corresponding to a selected time interval for periodically checking for background processing.

4. A method as defined in claim 1, wherein:
    if there are any background processing tasks awaiting execution and if there is no receive processing to do, the method further comprises executing the background tasks, but without any guaranteed minimum processing time.

5. A method for scheduling operations of a network adapter, comprising the steps of:
    executing a polling loop, including checking for received data processing to perform, performing a limited amount of any received data processing that needs to be performed, and identifying any timer related or other background processing tasks that need to be performed;
    executing background processing tasks, if any are identified in the polling loop; and
    returning to the polling loop from any background processing tasks no later than upon expiration of a predetermined minimum background processing time;
    whereby latency in processing received data is minimized, while still guaranteeing processing time for necessary background tasks.

6. A method as defined in claim 5, wherein:
    the step of performing a limited amount of received data processing includes counting a first preselected number of buffers of received data processed before attempting to identify any background processing tasks awaiting execution, wherein processing no more than the preselected number of buffers provides a maximum time between successive attempts to identify background tasks.

7. A method as defined in claim 6, wherein:
    the step of identifying background tasks includes counting a second preselected number of receive buffers processed, wherein a transfer is made to background processing after processing the second preselected number of buffers of received data.

8. Apparatus for scheduling operations of a network adapter, comprising:
    means for executing a polling loop, including means for checking for received data processing to perform, means for performing a limited amount of any received data processing that needs to be performed, and means operative after the means for performing a limited amount of received data processing, for identifying any background processing tasks that need to be performed;
    means for executing background processing tasks, if any are identified in the polling loop, wherein a predetermined minimum background processing execution time is guaranteed before a return to ongoing received data processing; and
    means for returning to the polling loop no later than upon expiration of said predetermined minimum background processing time;
    whereby latency in processing received data is minimized, while still guaranteeing processing time for necessary background tasks.

9. Apparatus as defined in claim 8, wherein:
    the means for identifying background tasks includes means for checking for the presence of tasks already in progress, and means for checking for the occurrence of timer interrupts.

10. Apparatus as defined in claim 8, wherein:
    the means for identifying background tasks includes means for counting receive buffers processed, wherein a transfer is made to background processing after processing a preselected number of buffers of received data.

11. Apparatus as defined in claim 8, and further comprising:
    means operable only if there are any background processing tasks awaiting execution and if there is no receive processing to do, for executing the background tasks without any guaranteed minimum processing time.

12. A method for scheduling operations of a network adapter, comprising the steps of:

executing a polling loop, including checking for received data processing to perform, performing a limited amount of any received data processing that needs to be performed, and then identifying any background processing tasks that need to be performed;

executing background processing tasks, if any are identified in the polling loop, wherein there is a guaranteed time interval where no receive interrupts are processed, said interrupts indicating reception of new received data; and, returning to said polling loop no later than upon expiration of a predetermined background processing time;

whereby latency in processing received data is minimized, while still guaranteeing processing time for necessary background tasks.

13. A method as defined in claim 12, wherein:

if background processing completes before said guaranteed time interval, processing of received data is returned to by forcing a receive interrupt.

* * * * *